July 6, 1926.
1,591,380
E. F. HARMER
APPARATUS FOR MAKING PERSPECTIVE DRAWINGS
Filed July 13, 1922
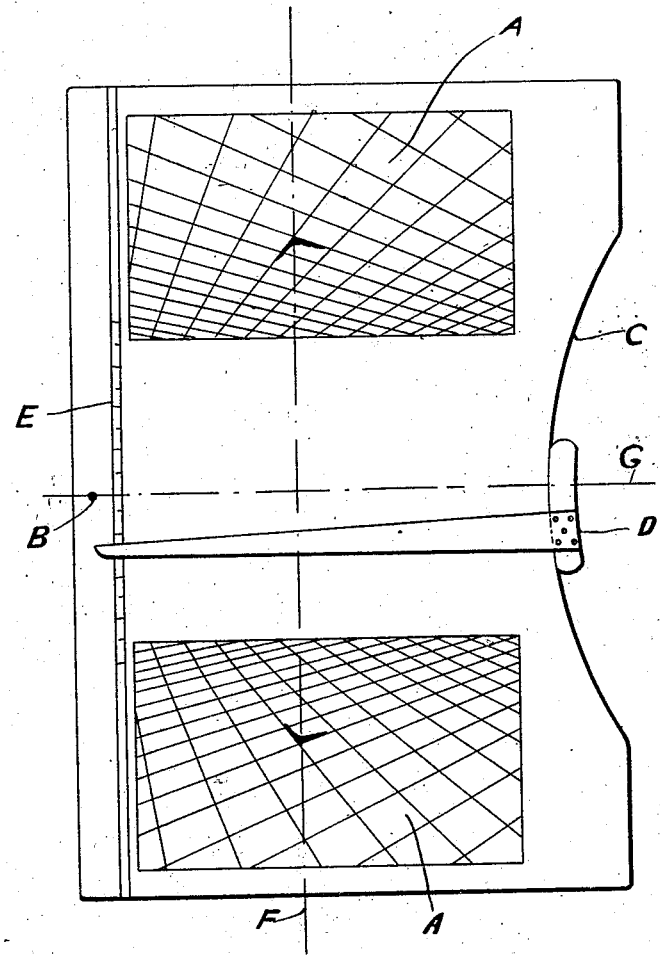
Inventor
Ernest F. Harmer
by H.B.Willson &co.
Attorneys Patented July 6, 1926.

1,591,380

UNITED STATES PATENT OFFICE.

ERNEST FREDERICK HARMER, OF SOUTHAMPTON, ENGLAND.

APPARATUS FOR MAKING PERSPECTIVE DRAWINGS.

Application filed July 13, 1922, Serial No. 574,744, and in Great Britain September 23, 1921.

This invention relates to a method and means of producing perspective drawings or the like, and has for its object to provide an improved apparatus or device that will enable perspective drawings, or the like to be produced without the construction lines and geometrical work ordinarily required in producing these drawings.

To attain this object I arrange a board or base on which all the essential data such as the vanishing points measuring lines, and a diagram for facilitating the making of perspective plans, are set out in correct relation to each other and from this data the required perspective can be drawn direct.

In accordance with my invention I provide one or more diagrams, representing the plans of horizontal plane surfaces divided into units of measurements in two directions at right angles to each other, as they would appear in perspective, at any particular angle to the picture plane, and at the sides of the board or base corresponding vanishing points or their equivalent on the line of horizontal vision.

Where a vanishing point occurs outside the area of the board or base I make use of any suitable form of centrolinead preferably the following:—

The edge of the board is curved and around this curved edge a T-square with curved head moves forming radiating lines which coincide with those drawn from the vanishing point.

The top and bottom edges of the board are formed as straight edges so that an ordinary T-square can be used to project the various lines and points from the perspective plan or diagram on to the perspective drawing that is being made.

Vertical distances are measured either in the usual way by means of an ordinary scale on the central measuring line F or alternatively a vertical scale E can be fixed on the board itself and projected on the drawing by means of the radiating T-square on the curved edge or an ordinary ruler applied to the fixed vanishing point B at the opposite edge, with a corresponding scale on the other side.

In the accompanying drawing:—

A—A. Diagrams for making plans in perspective.
B. Fixed vanishing point.
C. Curved edge of board.
D. T-square with curved head.
E. Fixed scale.
F. Vertical measuring line.
G. Horizontal line of vision.

The method of using this apparatus is as follows:—The plan of the object or building is drawn direct in perspective by means of a piece of tracing paper laid over one of the diagrams A—A, making use of the vanishing point B, or the equivalent C to ensure accuracy, the space between each pair of radiating lines representing the unit of measurement, which can be subdivided to any required extent. In the drawing the lower diagram is the one for use with the board in the position shown, the upper one being used if the board is reversed.

The various points and lines are then projected on to the required drawing by means of an ordinary T-square, working from top or bottom edge of the board.

The vertical heights of points and lines are then measured by means of an ordinary scale laid upon the measuring line (F), or by means of an equivalent scale drawn at the side of the apparatus (E), using the vanishing points provided to rule the said lines by and in this way the required perspective drawing is obtained. The intersection of the thickened lines shows a suggested position for the angle of a building or the like.

I claim:—

A perspective drawing outfit comprising a drawing board having a portion of one side edge curved inwardly upon the arc of a circle and adapted to be engaged by the head of a T-square with the blade portion of the T-square extending radially of said curved edge across the board, and plotting charts upon the end portions of said board with a drawing space between them, each of said charts having lines radiating from two vanishing points one of which co-incides with the center of said circle and the other of which is positioned within the confines of the board.

In testimony whereof he has affixed his signature.

ERNEST FREDERICK HARMER.